(12) United States Patent
Firkan

(10) Patent No.: US 9,550,673 B2
(45) Date of Patent: Jan. 24, 2017

(54) PROCESS OF SODIUM PEROXIDE PRODUCTION

(71) Applicant: Serdar Firkan, East Hanover, NJ (US)

(72) Inventor: Serdar Firkan, East Hanover, NJ (US)

(*) Notice: Subject to any disclaimer, the term of this patent is extended or adjusted under 35 U.S.C. 154(b) by 34 days.

(21) Appl. No.: 14/663,206

(22) Filed: Mar. 19, 2015

(65) Prior Publication Data

US 2015/0266733 A1    Sep. 24, 2015

Related U.S. Application Data

(60) Provisional application No. 61/969,088, filed on Mar. 22, 2014, provisional application No. 61/940,361, filed on Feb. 14, 2015, provisional application No. 61/940,832, filed on Feb. 14, 2015.

(51) Int. Cl.
*C01B 15/043* (2006.01)

(52) U.S. Cl.
CPC ............ *C01B 15/0435* (2013.01); *Y02P 20/13* (2015.11)

(58) Field of Classification Search
None
See application file for complete search history.

(56) References Cited

U.S. PATENT DOCUMENTS 2,671,010 A * 3/1954 Governale .......... C01B 15/0435
23/293 R

* cited by examiner

*Primary Examiner* — Colin W Slifka

(57) ABSTRACT

A sodium peroxide production method and process layout design integrated with sodium extraction unit from sea water, salt lake, and sodium production by electrolysis, and integrated with exothermic reactor based power generation unit with a stepwise and batch wise method of producing sodium peroxide from 115° C. to 450° C. under oxygen and nitrogen gas mixture isolated from atmospheric conditions and humidity. A sodium peroxide production facility is designed to have modular process units which is installed as an independent facility or connected to another chemical plant or refinery. A sodium peroxide production facility having reduced dependency to pure sodium and offering flexible installation location including oil platforms and ships. A sodium peroxide production method from sea water, brine or sodium salt.

7 Claims, 4 Drawing Sheets

PROCESS OF SODIUM PEROXIDE PRODUCTION

REFERENCE TO PENDING PRIOR PATENT APPLICATIONS

This patent application:

(1) claims benefit of U.S. Provisional Application No. 61/969,088, filed Mar. 22, 2014 by Serdar Firkan for PROCESS OF SODIUM PEROXIDE PRODUCTION; and (2) claims benefit of U.S. application Ser. No. 14/622,827, filed Feb. 14, 2015 by Serdar Firkan for AIR INDEPENDENT PROPULSION AND POWER GENERATION SYSTEM BASED ON EXOTHERMIC REACTION SOURCED THERMAL CYCLE which is a continuation of U.S. Provisional Patent Application No. 61/940,361, filed Feb. 14, 2014 by Serdar Firkan for EXOTHERMIC REACTOR WITH EXOTHERMIC REACTION CHAMBERS AND EXOTHERMIC INJECTORS FOR HEATING, ELECTRIC AND POWER GENERATION; and continuation of U.S. Provisional Patent Application No. 61/940,832, filed Feb. 18, 2014 by Serdar Firkan for EXOTHERMIC REACTOR FUEL.

The two above-identified patent applications are hereby incorporated herein by reference.

REFERENCES CITED

US Patent Documents

| application Ser. No. | Date Filed | Principal Inventor |
| --- | --- | --- |
| 1,685,520 A | September 1928 | CARVETH |
| 1,796,241 | March 1924 | CARVETH |
| 1,501,756 | July 1924 | DOWNS |
| 2,671,010 | November 1951 | GOVERNALE |
| 2,850,442 | September 1958 | WILSON |
| 3,119,756 | January 1964 | THOMAS |

FIELD OF THE INVENTION

This invention relates to produce sodium peroxide as a widely available standard fuel for exothermic reactor systems which produce heat, power and electric. The invention relates to production facility and process using sodium peroxide from any sodium source mainly based on electrolysis of sodium salt (NaCl) with a mixture of other salts and or alkali metal halides. Where received sodium (Na) from electrolysis thereafter reacts with oxygen gas in a reactor from 200° C. to around 450° C. in order to produce pure sodium peroxide ($Na_2O_2$). The invention relates to use some of the produced sodium peroxide as exothermic reactor fuel source in exothermic reactor systems in order to reduce the production costs and to decrease dependency on other energy sources.

BACKGROUND OF THE INVENTION

Sodium peroxide is a main pure chemical source compound for widely used chemicals like sodium hydroxides. Since alternative methods and sources have been discovered for producing sodium hydroxide, sodium peroxide production has been declined to supply only particular industrial purposes. Sodium peroxide was a solid fuel for rockets and no longer in use. Another previous application is the production of oxygen in submarines and for scuba diving which than lithium peroxide is replaced with.

Regarding my non-provisional patent application for exothermic reactor based thermal cycle (U.S. patent application Ser. No. 14/622,827) which is designed for power generation by using exothermically reactant products in order to produce overheated steam and/or gas to be supplied to turbine systems, one of the said exothermically reactant for exothermic reactors; which is then called as "exothermic fuel"; is selected as sodium peroxide. Regarding my provisional application (U.S. patent application Ser. No. 61/940,832) for exothermic fuel, large scale of sodium peroxide is needed to be produced systematically. The said exothermic fuel, herein sodium peroxide, is needed to be produced under standard methods in order to be served as universally standard product.

Regarding my provisional application (U.S. No. 61/940,832), sodium peroxide may be used as an alternative fuel in marine and power generation.

Former sodium peroxide production methods were based on supply of pure sodium to the plant. As being the sodium was widely used in leaded gasoline fuels until $21^{st}$ century and its usage is now in decline in other parts of the world, sodium production is also very limited to produce large scale amount of sodium peroxide to be used as a worldwide scale fuel production.

The object of the invention is to enable producing sodium peroxide from sea water and brine and from byproducts of sodium peroxide exothermic reaction products coming from the exothermic reactors like oxygen gas and sodium hydroxide aqueous solution with water.

The object of the invention is to enable the installation of a least pure sodium source dependent sodium peroxide production facility.

The object of the invention is to enable production of sodium peroxide in a more cost effective way by benefiting the best practices from the industry and previously known methods.

SUMMARY OF THE INVENTION

The sodium peroxide compound is selected as being the sodium is the most available source on earth. Sodium can be produced from sea water, salt lake or from various compounds. Extracting sodium is one of the first steps of sodium peroxide production. The following process is to combine liquid sodium with oxygen gas in a vessel with mechanical stirring at a temperature range preferably from 115° C. to 450° C. by preventing humidity ingression.

Various methods have been applied for producing sodium peroxide since $19^{th}$ century. One of the methods which was known as Ethyl's method under U.S. Pat. No. 2,671,010 was an oxidation reaction system with a temperature range of 300° C. to 575° C. occurring on a rotating on a disc drum system with a thin sodium/sodium peroxide film. The disadvantage of Ethyl's method was low production capacity output due to being based on relatively slow circular drum speed and very thin layer (one millimeter) on the disc drum where a very long cylindrical drum is needed for higher outputs.

The other method for producing sodium peroxide was Carveth's method under U.S. Pat. No. 1,796,241 and U.S. Pat. No. 1,685,520 which was based on reacting sodium with oxygen enriched air at around 200° C. to 350° C. in a horizontally rotating cylindrical vessel. Carveth's method had a disadvantage that the production was based on air enriched with oxygen where the inlet of the sodium and discharge of the sodium peroxide exposes to atmosphere that was exposed to humidity which was negatively effecting the quality of the sodium peroxide.

The common disadvantage of the previous methods was leaving the sodium peroxide exposed to atmosphere and humidity which eliminates the control of the temperature and reduces the quality of sodium peroxide by letting the sodium peroxide reacting exothermically with the water coming from the condensation of the air during the cooling and storing of the sodium peroxide.

The other disadvantage which was also defined in Ethyl's (U.S. Pat. No. 2,671,010) method about Carveth's methods in U.S. Pat. Nos. 1,796,241 and 1,685,520 was those methods involve a two-step procedure requiring separate treatment steps performed in different manners and such prior techniques require, for example, the stepwise and batch wise processing of large charges, necessitating large cumbersome equipment.

The invention solves the need for large batch production options by controlling the process temperature and oxidation reaction more precisely.

The invention solves the production speed arrangement by offering the control on the oxygen flow rate in a humidity free environment by combining the oxygen with nitrogen free from humidity as well.

Another advantage of the invention is to apply vacuum pressure inside the sodium peroxide reaction tank and liquid sodium tank by offering lower start up temperatures for the injected liquid sodium and giving an option to increase the production efficiency.

Another advantage of the invention is eliminating the need for a revolving large vessel or a large drum system replacing by an agitation system with a controlled molten sodium flow.

Oxidation of sodium generally occurs with steps below which ends with sodium peroxide:

$$4Na + O_2 \rightarrow 2Na_2O \quad (1)$$

$$2Na_2O + O_2 \rightarrow 2Na_2O_2 \quad (2)$$

Another advantage of the invention is to use alternative sources for sodium inside the same process and reducing the dependency on supply of pure metallic sodium. The invention has an extended method for using sea water desalination byproducts like NaCl as a source for sodium. The electrolysis of NaCl or NaCl bath containing other salts and halides provides sodium liquid on one electrode and then the sodium liquid is sent to a closed vessel to be reacted with oxygen as above described.

Another advantage of the invention is providing its own electric source for the electrolysis and desalination which is supplied by the exothermic reactor power generation system. The invention is enabling the connection of an exothermic reactor based thermal cycle and power generation unit which is integrated to the process and uses some part of the produced sodium peroxide as a fuel.

Another advantage of the invention is to enable a method for continuous production of sodium peroxide in a closed process cycle where the byproducts of the said exothermic reactor which are oxygen gas and aqueous sodium hydroxide is again be able to be used in the production of sodium peroxide. With this respect, the invention comprises a facility which having a self-sufficient raw material supply loop.

The invention solves the emission problems during energy production when compared with fossil fuel systems. The invention comprises an exothermic reactor system (U.S. Non-Provisional patent application Ser. No. 14/622,827) which has no exhaust emission output to the atmosphere.

Sodium hydroxide has a wide industrial use. The invention enables the reselling of end reaction products herein it is the sodium hydroxide which is commonly known as caustic soda. With this option the cost of the produced sodium peroxide is reduced.

Another advantage of the invention is to use combined heat cycle including the excessive heat form other steps or parts of the invention for each other during heating one step when cooling another step. So the invention itself comprises a good method example for efficient combined power generation and heat recovery.

Another main advantage of the invention is to sell the generated chlorine gas which is a valuable product for industry. This also reduces the production costs when discounted from other expenses.

Another advantage of the invention is to install the sodium peroxide production facility where sodium metal is not available but sea water or salted water or any querying or drilling operation using brine around. This gives the flexibility to install the facility to many alternate locations around world.

DETAILED DESCRIPTION OF THE INVENTION

The preferred embodiments of the invention are herein described. It should be noted that the articles "a", "an" and "the", as used in this specification, include plural referents unless the content clearly dictates otherwise.

The process flow diagram of the invention herein describes the method and facility layout for producing sodium peroxide, and includes only main process elements where gauges, PCUs (process control units), extra pumps, auxiliary pumps, auxiliary equipment, filtration systems, probes, and other standard and well known industrial details are not shown but still under the scope of the invention when put into installation and not ignorable components of the invention.

Figure 1:
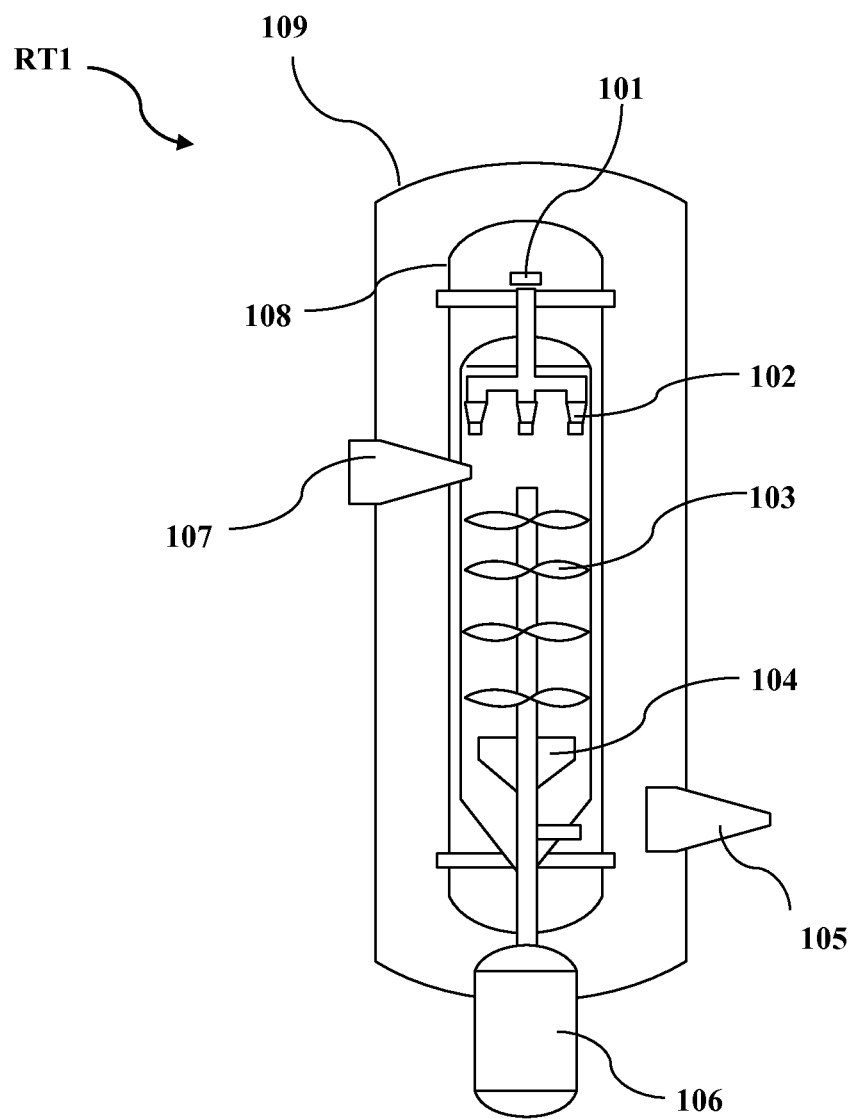
FIG. 1 is a schematic view, principally showing sodium peroxide reactor vessel basic layout.
Figure 5:
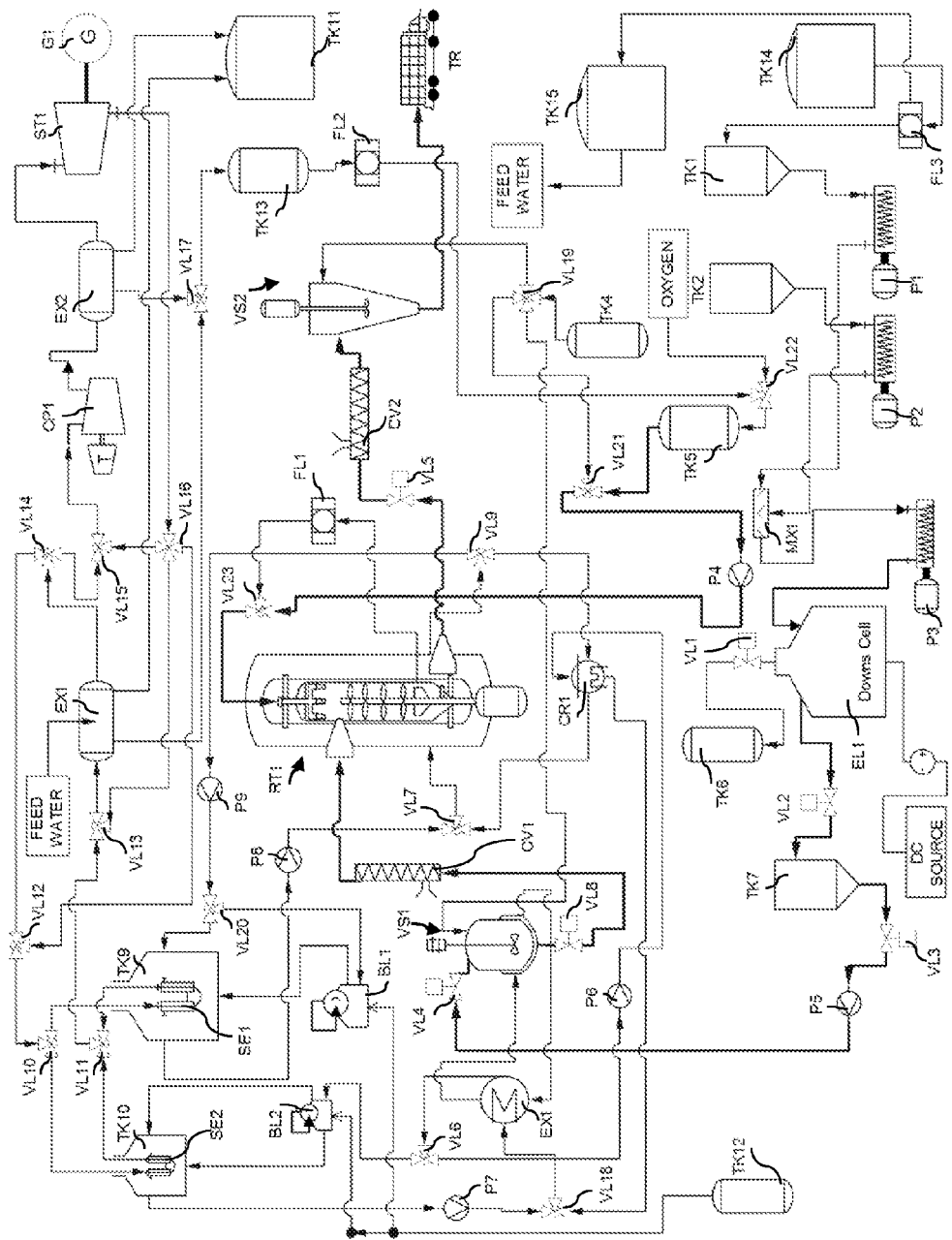
FIG. 5 is a process flow diagram of the invention principally showing basic process flow comprising main equipment and main flow lines.

Referring to FIGS. 1, and 5, embodiments of a reactor vessel RT1 comprises a thermal housing 109 which is filled with a heat transfer fluid preferably a synthetic one and has a cylindrical shape. A common type of synthetic heat transfer fluid is DOWTHERM Q, SLYTHERM 800 or any similar type. Another heat transfer fluid may be steam or any other type with a working temperature range up to 450° C. Thermal housing 109 has a connection to heat transfer fluid tank TK9 and CR1 for heating and cooling the reactor vessel RT1. The reactor vessel RT1 comprises a sodium inlet port 107 which lets the injection of liquid sodium into the reactor inner vessel 108 where the reaction takes place. The reactor vessel RT1 comprises an oxygen inlet port 101 connected to oxygen nozzle set 102 located on top of the reactor inner vessel 108 and arrayed circular relative to the vertical axis of the reactor inner vessel 108. The reactor RT1 comprises a propeller type rotating stirring paddle set 103 and conical rotating mixing paddle set 104 driven by an electric motor 106 located any suitable location either on sides or top or bottom of the reactor vessel RT1 connected to the stirring sets 103, and 104 through reactor inner vessel 108. The reactor vessel RT1 comprises a product discharge port 105 which is used for the output of the final product herein sodium peroxide.

Figure 2:
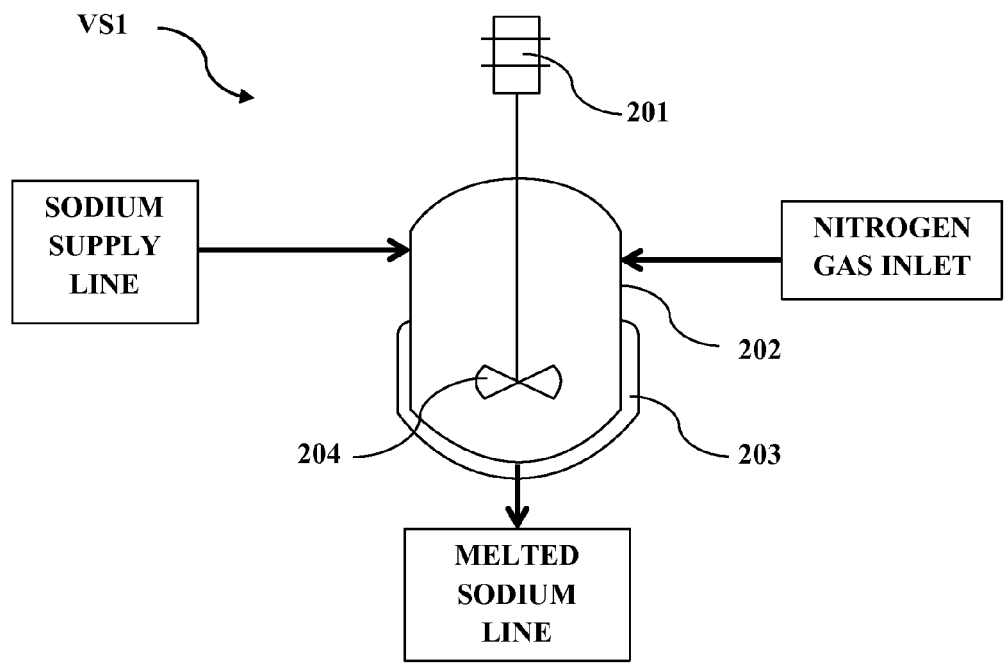
FIG. 2 is a schematic view, principally showing sodium supply vessel basic layout.

Referring to FIGS. 2, and 5, embodiments of a storage vessel VS1 comprises a vessel body 202 integrated with a thermal jacket 203 for heating and cooling. The vessel body 202 has preferably a cylindrical shape. The said storage vessel VS1 comprises a stirring paddle set 204 which is driven with an electric motor 201 for stirring the liquid sodium inside the vessel body 202. The solid sodium is supplied into the vessel body 202 through a sodium supply line preferably close to atmosphere and vacuumed in order to prevent oxidation and humidity. Nitrogen gas is injected to the vessel body 202 through a nitrogen gas inlet line which prevents the ingression of atmospheric air, oxygen and humidity. A heat transfer fluid is supplied to the thermal jacket 203 from a heat transfer boiling tank TK10 for heating the solid sodium to above 90° C. or preferably to 115° C.

Figure 3:
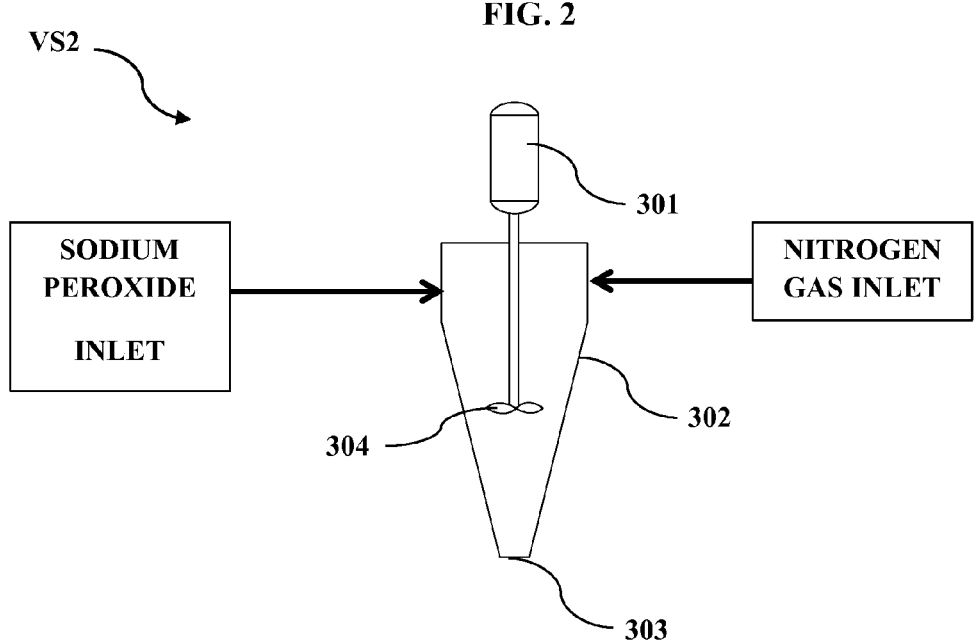
FIG. 3 is a schematic view, principally showing sodium peroxide storage vessel basic layout.

Referring to FIGS. 3, and 5, embodiments of a storage vessel VS2 comprises a vessel body 302 which has a conical vertical shape. The storage vessel has a connection to sodium peroxide line coming from the reactor vessel RT1 and has a connection to nitrogen gas line coming from the nitrogen tank TK4. Nitrogen gas protects the ingression of oxygen and humidity inside the storage vessel VS2. The storage vessel VS2 has a rotating paddle 304 which is driven by an electric motor 301 and located vertically on the vertical axis of the storage vessel VS2 enables the aeration of the solid sodium peroxide powder and protects being lumped inside the storage vessel VS2. The outlet 303 is connected to a discharge line or transfer line for transport TR. In order to protect sodium peroxide from moisture, synthetic base fluid is injected into the storage vessel VS2. As an example to synthetic base fluid, PIBs (polyisobutylene), PAOs (polyalphaolefins), water soluble PAG (polyglycols and polyalkyleneglycols) or synthetic di-esters preferably lower viscosity versions is used. BP Indopol is a good example for PIBs. ExxonMobil Spectrasynth is a good example for PAOs. BASF Plurasafe is a good example for water soluble polyglycols. CRODA Emkarox is another good example for soluble synthetic polyglycols base fluids.

Figure 4:
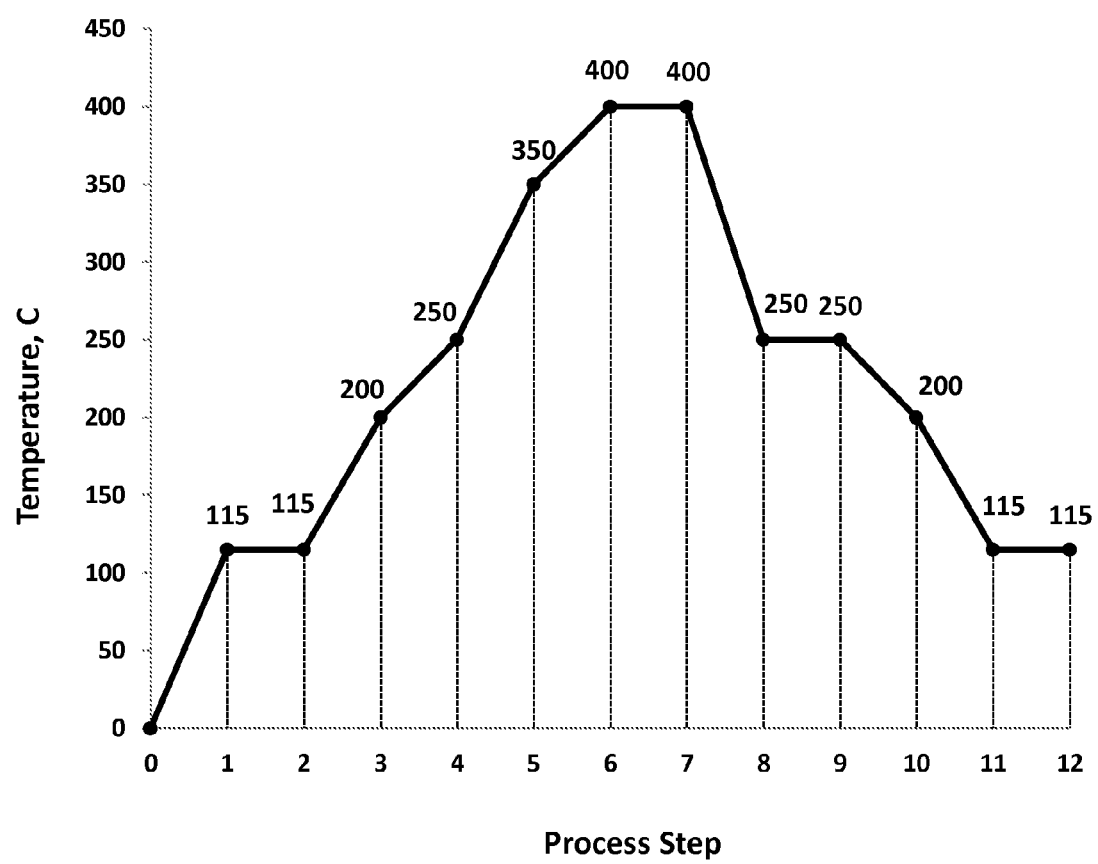
FIG. 4 is a graph, principally showing process step temperatures of the sodium peroxide reactor vessel.

Referring to FIG. 4, showing the graph of the temperatures inside the reactor vessel RT1 based on process steps. As an initial step between step 0 and step 1, the reactor vessel RT1 is heated up to 115° C. assuming that the start-up temperature is 0° C. which may change according to the environment where the invention is installed. Between step 1 and step 2, the reactor vessel RT1 temperature is maintained at 115° C., liquid sodium injection is started and stirring is started in reactor inner vessel 108. Between step 2 and step 3, injection of liquid sodium is continued, increasing reactor temperature up to 200° C. is started, and stirring is continued. At step 3 and until step 4, injection of sodium liquid is stopped, increasing the reactor temperature up to 250° C. is started, and injection of oxygen and nitrogen gas mixture is started. At step 4, heating the reactor is stopped, and until step 5 stirring is continued, oxygen and nitrogen gas mixture injection is continued, reactor temperature is monitored and enabled raising to 350° C. due to exothermic oxidation reaction inside the reactor. At step 5 and until step 6, stirring is continued, oxygen and nitrogen gas mixture injection is stopped and closed circulation of oxygen and nitrogen gas inside the reactor is started, temperature rise is enabled to 400° C., if needed cooling is started by cooling the reactor with heat transfer fluid at cooling heat exchanger CR1 in FIG. 5, in order to maintain maximum 400° C. (or alternatively 450° C. depending on the desired reaction time settings.). At step 6 and until step 7, temperature of the reactor is maintained at 400° C. (or alternatively 450° C. depending on the desired reaction time settings.), stirring is continued, oxygen and nitrogen gas closed circulation is continued, and if necessary more oxygen is injected. At step 7 and until step 8, cooling is started, reactor temperature is decreased to 250° C., stirring is continued, and closed circulation of oxygen and nitrogen inside the reactor is continued. At step 8 and until step 9, cooling is stopped, reactor temperature is maintained at 250° C., stirring is continued, and closed circulation of oxygen and nitrogen inside the reactor is continued. If needed additional oxygen is added at this step. At step 9 and until step 10, reactor temperature is cooled down to 200° C., stirring is continued, and closed circulation of oxygen and nitrogen inside the reactor is continued. At step 10 and until step 11, cooling of the reactor is continued, reactor is cooled until reaching to 115° C., stirring is continued, and oxygen and nitrogen gas circulation is stopped. At step 11 and until step 12, stirring is stopped, reactor temperature is maintained. This period is necessary for settling the sodium peroxide powder and flurries. At step 12, discharging of sodium peroxide is started under nitrogen gas and free from humidity, the reactor temperature is maintained at 115° C. for new production recycle starting from step 1. Alternatively oxygen gas is injected starting from step 5 and continued until step 7 and in this case processing period between step 6 and step 7 is extended, and until step 5, only nitrogen gas free from humidity is injected and circulated inside the reactor. The amount of necessary oxygen gas is injected at various step by splitting the volume per steps and plus arranging the oxygen gas and nitrogen gas mixture ratios. Filter FL1 is used for filtering the closed $O_2$ and $N_2$ gas mixture circulation.

Referring to FIG. 5, valves marked with VL1, VL2, VL3, VL4, VL5, and VL8 are one way valves, either mono directional or bi-directional from each ways, and activated either manually, electric, pneumatic, hydraulic or remotely.

Referring to FIG. 5, valves marked with VL6, VL7, VL9, VL10, VL11, VL12, VL13, VL14, VL15, VL17, VL18, VL20, VL21, VL22, and VL23 are three way valves, either mono directional or bi-directional from each ways, and activated either manually, electric, pneumatic, hydraulic or remotely.

Referring to FIG. 5, valves marked with VL16, VL19 are four way valves, either mono directional or bi-directional from each ways, and activated either manually, electric, pneumatic, hydraulic or remotely.

Referring to FIG. 5, pumps marked with P4, P5, P6, P7, P8, and P9 are any type appropriate pumps for the said process herein, and may be bi-directional.

Referring to FIG. 5, turbo compressor marked with CP1, is a unit supplying low pressure saturated steam from exothermic reactor EX1 to high pressure exothermic reactor EX2 for overheating.

Referring to FIG. 5, tanks marked with TK9 and TK10 are heat transfer systems filled with synthetic heat transfer fluids, and heated with either gas boilers marked with BL1 and BL2 or with steam supplier heat exchanger tubes marked with SE1 and SE2. Steam exchanger systems are supplied with steam from either exothermic reactor EX1 or exothermic reactor EX2 depending on the heat demand and target fluid temperature inside the tanks TK9 and TK10. The valves marked with VL10, VL11, VL12, VL13, VL14, VL15, and VL16 are located and used to divert the necessary amount and type of steam with an extended flexibility. With the said valves, low enthalpy steam from exothermic reactor EX1 or high enthalpy steam from exothermic reactor EX2 is flexibly used.

Referring to FIG. 5, valve VL17 is used to send oxygen gas coming from exothermic reactors EX1 and EX2 to the oxygen tank TK13 in order to be filtered at filtration unit FL12 for removing any deposits and is sent to oxygen tank TK5.

Referring to FIG. 5, embodiment is a process flow diagram of the invention. According to the diagram sea water or salt water or any source including sodium chloride NaCl is supplied to the tank TK14. Fluid inside tank TK14 is sent to desalination unit FL3 for separating sodium chloride. Separated sodium chloride is sent to a storage tank TK1. Deionized or desalted water is sent to another storage tank TK15. The water inside tank TK15 is used as feed water for exothermic reactor EX1. Sodium chloride is also be added directly to the storage tank TK1 from outsource as well. Calcium Chloride (CaCl2) is supplied to tank TK2. Alternatively $BaCl_2$ and/or $SrCl_2$ are added to tank TK2 or another tank system to be added furthermore. Sodium Chloride is pumped to inline mixing unit MX1 via screw pump P1, Calcium Chloride ($CaCl_2$) is pumped to inline mixing unit MX1 via screw pump P2. With pump P3, mixture is pumped to Downs Cell type electrolysis bath EL1 for electrolysis. At electrolysis bath EL1, the sodium chloride (NaCl) and Calcium Chloride ($CaCl_2$) mixture bath is heated up to 105° C. or 5° C. above boiling point of water at the location in order to remove the moisture and water. The said moisture removal process is also being taken in place inside tanks TK1 and TK2 alternatively. The electrolysis bath EL1 is supplied with a DC current source for electrolysis with a voltage of 7 to 8 V and a current of 7 to 8 kA/m2. DC source is supplied from generator system G1.

Referring to FIG. 5, the Chlorine gas (Cl2) from electrolysis in electrolysis bath EL1 is charged into a storage tank TK6 and liquid sodium (Na) is charged to a storage tank TK7 coming from the electrolysis bath ELL Sodium storage tank TK7 is equipped with a heating system to maintain the heat slightly above the melting point of the sodium (Na) around 98° C. The liquid sodium (Na) is pumped to the storage vessel VS1. From the storage vessel VS1 liquid sodium (Na) is sent to reactor vessel RT1 by a screw type conveyor CV1. Screw type conveyor CV1 is sealed and has thermal jacket coating in order to prevent the solidification of the liquid sodium (Na). After the reaction completed in reactor vessel RT1, final product is sent to storage vessel VS2 by screw type conveyor CV2. From the storage the vessel the sodium peroxide is ready to be transferred TR preferably with nitrogen coated transport vessel or in a synthetic fluid mixed as above described.

Referring to FIG. 5, invention has modular design concept integrating the following units. The invention is installed either as a whole group of the said units or connected to a nearby facility or facilities which contains the said units or sources. For example, the invention is connected to an oil refinery in order to benefit from the excessive steam for heating the above said process steps and/or may connected to a desalination facility in order to benefit the usage of Sodium Chloride (NaCl) as a raw material. The number of examples may be increased in multiple combinations. The modular units of the invention are listed as below:

A. Sea Water or Salt Water Desalination and Deionization Unit consisting of items marked with TK4 and FL3, B. Electrolysis Unit consisting of items marked with EL1, MX1, TK2, TK1, P1, P2, P3, TK6, TK7, VL1, VL2 for Sodium and Chlorine Production, C. Sodium Peroxide Reactor Unit RT1 and other units connected directly including items marked with VS1, VS2, D. Exothermic Power Generation Unit including items marked with EX1, EX2, CP1, G1 and other directly connected units, E. Heat Transfer System TK9, TK10, BL1, BL2, SE1, SE2 Combined with Steam Lines,

INDUSTRIAL APPLICABILITY

The invention comprises the best practices applied by the industry. The result products of the invention such as Chlorine gas is very valuable and is in use of many industrial areas. Sodium production from water desalination and electrolysis is very common and still in use. Sodium peroxide has been used as an exothermic fuel for rockets in the past, used by paper industry, by detergent industry and still in use for special applications by the industry. And also sodium peroxide was in use for many years in order to produce oxygen gas for submarines.

Today, some of the fuel cells are based on oxygen and hydrogen gas. Sodium peroxide is a good source for oxygen production for fuel cells like SIEMENS PEM models and is a very effective source if used in combination with exothermic reactors especially in marine applications.

The invention has a particular design which a modular system is combining with the exothermic fuel that is used in exothermic reactor systems. A standardized exothermic fuel enables the design and usage of the exothermic reactors more widely. The exothermic fuel refineries can be established at any location where sodium element or caustic soda (sodium hydroxide) or any other alternative sodium containing chemical compound is available.

The invention is capable to be applied to industrial plants where possible integration are in subject for pre-processing or further processing or benefiting from sodium peroxide for production of another compound.

Any excessive amount of sodium based product is converted into sodium peroxide by using commonly known electrolysis methods and heating process and reaction processes.

Byproducts of the invention after its exothermic chemical reaction are oxygen and sodium hydroxide. Byproduct sodium hydroxide is converted back to sodium peroxide by just using some portion of the produced electric power and heat coming from the exothermic reactor power generation system. This is a closed cycle system for self-supply in case of emergency or far place from fuel supply facilities.

Having described the invention what is claimed is:

1. A method for producing sodium peroxide ($Na_2O_2$) in a closed continuous processing cycle;

wherein the oxidation reaction of molten sodium is set to occur in a temperature range of 200° C. to 450° C. in a closed reaction vessel isolated from atmospheric exposure;

wherein the oxidation reaction vessel pressure is first vacuumed to negative pressure and then filled with a gas mixture of oxygen and nitrogen;

wherein the oxidized sodium as sodium monoxide is continued to be retreated with oxygen as the second stage of oxidation by agitating molten metallic sodium and sodium monoxide mixture in a closed vessel under nitrogen gas blanket at a temperature range of 250° C. to 450° C.;

wherein the two oxidation stages which the oxidation of metallic sodium becoming sodium monoxide is the first stage and oxidation of sodium monoxide becoming sodium peroxide is the second stage; and those two oxidation stages are occurred inside the same reaction vessel;

wherein the complete mass of metallic sodium is continuously being delivered to the reaction vessel during the oxidation reaction without interrupting the oxidation process;

wherein the production rate and batch size are variable by the flow of molten sodium and oxygen gas into the reaction vessel without interrupting the complete process cycle.

2. As described in claim 1, a method for producing sodium peroxide from sea water source and sodium hydroxide supply.

3. As described in claim 1, a method for producing sodium peroxide as an exothermic reactor fuel to be used for producing useful thermal cycle for power generation, and heat transfer between mediums.

4. As described in claim 1, a method for producing sodium peroxide in a temperature controlled process;
   wherein the temperature of the sodium peroxide inside the reaction vessel is first cooled down to 115° C. and then transferred to a storage vessel for final cooling;
   wherein the said storage vessel is equipped with agitator and the agitation is done under nitrogen gas ($N_2$ (g)) blanket.

5. As described in claim 1, a method for producing sodium peroxide on a mobile sea platform wherein the said platform is located on sea or a lake and sourcing the sodium from the sea salt by electrolysis.

6. As described in claim 1, a method for producing sodium peroxide wherein the process is connected to another chemical process facility either sourcing sodium from or supplying sodium peroxide to chemical plant for further processing.

7. As described in claim 1, a method for isolating the sodium peroxide from humidity or water ingression under nitrogen blanket wherein the sodium peroxide is then mixed with a synthetic base fluid.

* * * * *